(12) United States Patent
Bauer et al.

(10) Patent No.: US 8,259,927 B2
(45) Date of Patent: Sep. 4, 2012

(54) METHOD AND ARRANGEMENT FOR THE ADAPTIVE FILTERING OF SIGNALS

(75) Inventors: Wolfgang Bauer, Vienna (AT); Johann Wurz, Zwettl (AT)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 522 days.

(21) Appl. No.: 12/514,959

(22) PCT Filed: Nov. 15, 2006

(86) PCT No.: PCT/DE2006/002006
§ 371 (c)(1),
(2), (4) Date: May 14, 2009

(87) PCT Pub. No.: WO2008/058492
PCT Pub. Date: May 22, 2008

(65) Prior Publication Data
US 2010/0002867 A1    Jan. 7, 2010

(51) Int. Cl.
*H04M 9/08* (2006.01)
(52) U.S. Cl. .............................. 379/406.08; 379/406.01
(58) Field of Classification Search ............ 379/406.01, 379/406.08
See application file for complete search history.

(56) References Cited

U.S. PATENT DOCUMENTS

| | | | |
|---|---|---|---|
| 5,305,309 A * | 4/1994 | Chujo et al. | 370/290 |
| 5,483,594 A | 1/1996 | Prado et al. | |
| 6,226,380 B1 | 5/2001 | Ding | |
| 6,563,803 B1 * | 5/2003 | Lee | 370/290 |
| 6,859,531 B1 * | 2/2005 | Deisher | 379/406.05 |

FOREIGN PATENT DOCUMENTS

| | | |
|---|---|---|
| EP | 1320941 B1 | 9/2001 |
| WO | 0072556 A1 | 11/2000 |

OTHER PUBLICATIONS

International Search Report dated Aug. 8, 2007.

* cited by examiner

*Primary Examiner* — Walter F Briney, III

(57) ABSTRACT

The invention relates to a method for adaptive filtering in which a level of a reference signal necessary for the adaptive filtering is determined in the context of an adaptation by estimation, using a quantity equivalent to the reference signal, wherein the filtering is dependent on the electrical power of at least one signal extracted from a transmission channel to be filtered, and the equivalent quantity is determined by means of a mathematical function based on the electrical power of at least the extracted signal. The invention further relates to an arrangement with means for carrying out the method.

9 Claims, 2 Drawing Sheets

METHOD AND ARRANGEMENT FOR THE ADAPTIVE FILTERING OF SIGNALS

CROSS-REFERENCE TO RELATED APPLICATIONS

This application is the United States national phase under 35 U.S.C. §371 of International Patent Application No. PCT/DE2006/002006, filed on Nov. 15, 2006. That application is incorporated by reference herein.

BACKGROUND OF THE INVENTION

1. Field of the Invention

The invention relates to a method for the adaptive filtering of signals as well as an arrangement for the adaptive filtering of signals.

2. Background of the Art

A known method for performing adaptive filtering consists of using an output signal of a filter, used especially as a reference, as a reference signal for comparison with an output signal of a filter carrying out the adaptive filtering, and adjusting the parameters of the adaptive filter on the basis of the comparison results.

With known adaptive filters different approaches are followed. For example, some adaptive filters provide a compromise, one between a requirement at a fixed adaptation speed to adapt as quickly as possible, if only the echo is present, and a requirement not to regulate the adaptive filter during cross-talk, with this occurring more frequently the greater the adaptation speed.

There is a problem particularly during the use of adaptive filters with so-called echo cancellers, which are used primarily in telecommunications and in particular during voice transmission—the so-called Voice over IP (VoIP)—that the reference signal is superimposed on greatly varying interference signals. In this field of application one speaks of so-called double-talk (cross-talk), the simultaneous speaking of two remote participants in the communication. Here the reference signal represents the superimposition of local signals, the so-called near-end signals of the local participant, and the echo from it on the part of the remote participant.

An optimal adaptation behavior therefore requires that the speed of the adaptation be adapted to the relationship of reference signal to the interference signal, with the level of the reference signal usually needing to be determined.

For example, a method known from EP 1 320 941 B1 consists of estimating an amplification factor between a residual echo occurring on the transmission channel, used as the reference signal, and a remote, so-called far-end signal and determining the level of the residual echo from it. Other methods again rely on an estimate of the residual echo based on the correlation between the near-end signals and the far-end signals.

From U.S. Pat. No. 6,226,380 B1 is known a method and arrangement of distinguishing between echo path change and double talk conditions in an echo canceller.

BRIEF SUMMARY OF THE INVENTION

The task of the present invention is to provide an optimized method for the echo cancellation as well as an arrangement for the adaptive filtering.

According to the inventive method, a level of a reference signal necessary for the adaptive filtering is determined in the context of the adaptation, using a quantity equivalent to the reference signal, with the filtering being dependent on the electrical power of at least one signal extracted from the transmission channel to be filtered and the equivalent quantity of the extracted signal being determined by means of a mathematical function based on the electrical power of at least the extracted signal. Understood by power is the so-called quadratic mean value in digital signal processing, because this represents the basis of a power calculation.

Preferably the mathematical function uses advantageously an initial power from a signal ($S_{in}$), emitted by a local participant, and an echo signal from the transmission channel, producing the first electrical power, to determine the equivalent quantity, since these signals already represent good indicators.

Alternatively, or advantageously in addition, a further embodiment for the determination of the equivalent quantity is given so that the mathematical function uses a second electrical power resulting from a difference signal generated from a signal emitted by the local participant and an echo signal from the transmission channel and a compensated echosignal.

Alternatively and preferably in addition to one of the aforementioned embodiments, a further advantageous optimization may be obtained, if the mathematical function uses an third electrical power of the echo signal from the transmission channel, estimated by the adaptive filter, for the determination of the equivalent quantity.

As a rule, the embodiment, where the determination of the equivalent quantity by the mathematical function is done as an estimate of a fourth electrical power of the echo signal from the transmission channel, this estimate being based on the first electrical power, the second electrical power and the third electrical power, is an advantage, since an estimate based on these three quantities enhances the effectiveness of the adaptation, particularly during the use of the inventive method for echo cancellation.

Preferably the estimate is done according to the formula $$P_{Echo,est} = P_{diff} \cdot \sqrt{\frac{P_{Sin}}{P_{est}}}$$

with $$P_{diff} = \frac{1}{2} \cdot (P_{Sin} - P_{err})$$

defined, with
$P_{sin}$ the first electrical power,
$P_{err}$ the second electrical power,
$P_{est}$ the third electrical power, and
$P_{Echo,est}$ the fourth electrical power An estimate according to the abovementioned formula has excellent properties re: the speed and effectiveness of the adaptive filtering, in particular when the inventive method is used for echo cancellation tasks, since, as in simulations, they enable an outstandingly precise estimate of the reference signal.

If the adaptive filter is operated as an echo canceller, and if the adaptive filter based on a balancing of a fifth electrical power at which the echo elimination signal, used as a summing point to generate the output signal of the adaptive filter, is reset into an initial state of the adaptation, echo changes, which otherwise are difficult to distinguish from the double-talk interference caused by the simultaneous speaking of participants, are detected significantly better. Due to the detection and resetting, a new adaptation of the filter is started then in sufficient time, if a detuning of the adaptation process, i.e., a generation of erroneous coefficients, threatens.

Preferably a resetting occurs by the absolute quantity of a fifth electrical power exceeding a first threshold value so that there are additional degrees of freedom in the optimization of the method for setting a particularly suitable threshold value, with this being done through simulations or through experimental trial runs.

In a further advantageous embodiment of the method, the resetting occurs when the duration during which the threshold value is exceeded without interruption attains a second threshold value defining a period. As a result only briefly occurring peaks are captured and prevented that trigger a new adaptation without justification. In addition, this also offers an opportunity for the method to improve the detection rate through a skilled selection or setting of the second threshold value, which again can be done through simulations or through experimental trial runs.

In a further embodiment the first threshold value is defined based on a proportional value indicative of double-talk as well as based on the second electrical power and third electrical power. As a result, the advantageous degree of freedom of the first threshold value is exploited optimally so that, based on the actually occurring quantities, as mentioned, automatically adjusted and adapted in the embodiment, erroneous detections are clearly minimized or almost eliminated. Thus an embodiment in which the determination of the first threshold value is defined according to the formula $$P_\Delta = s \cdot \sqrt{(P_{est} \cdot P_{err})}$$

with
s the proportional value for the indication,
Perr the second electrical power,
Pest the third electrical power and
$P_\Delta$ the fourth electrical power
turns out to be particularly advantageous.

The inventive adaptive filter supports in an advantageous manner the execution of the inventive method through means implementing the previously described approaches.

Additional details as well as advantages of the invention are explained in greater detail based on the embodiments represented in FIGS. 1 and 2.

DETAILED DESCRIPTION OF THE INVENTION

Figure 1:
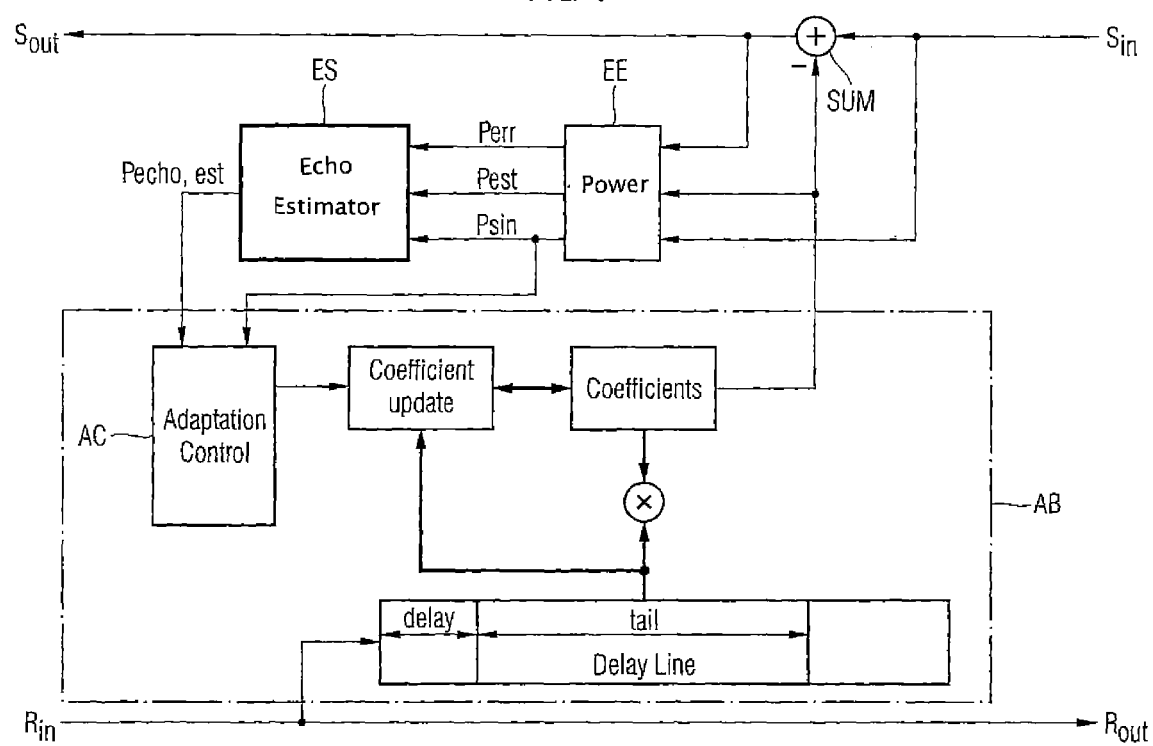
FIG. 1 shows a block diagram of an echo canceller implementing the inventive method, used to optimize electrical powers determined for the reference signal estimation.

In FIG. 1 the block diagram of an echo canceller implementing the inventive method is represented, which is used to optimize the electrical powers determined for the reference signal estimation.

Thus in the schematic representation an echo canceller according to the invention is depicted between the echo path, i.e., the arrow between a first Port $S_{Out}$ at which a voice signal to be sent on the echo path is emitted and a second Port $S_{in}$ at which an echo signal arrives from the echo path as well as a third Port $R_{in}$, where the voice signals to be received from the echo path are inputted and then emitted to the echo path via a fourth Port $R_{Out}$.

Depicted in addition is an adaptation unit AB for doing the adaptive filtering, which generates an estimated echo signal, necessary for the coefficients for the adaptation and an output signal based thereupon, which is conducted to a summer SUM for the purpose of eliminating an echo, where it is deducted from an echo affected signal received on the echo path via the second Port $S_{Out}$ and, completely cleaned of the echo in the ideal case, is emitted via the first Port $S_{Out}$.

Furthermore, it should be recognized that the adaptation unit, has processing units, known from prior art, that are required for this, with at least the adaptation control AC being modified in order to implement the inventive method. To control the adaptation unit AS, as may be seen from the representation, the electrical power of an echo signal $P_{Echo,est}$, estimated by means of the inventive method, as well as the electrical power of a near-end signal $P_{sin}$, are fed, along with the usual additional signals, to the adaptation control AC.

Because of these signals the adaptation control AC is able to calculate optimally adjusted coefficients, which makes it possible to improve the echo cancellation.

According to the invention, the electrical power levels $P_{sin}$, $P_{err}$, $P_{est}$ of the signals mentioned are determined by means of a power determining device EE from an output signal, comprised of a residual echo and a signal from the near-end participant, a near-end signal, comprised of an echo and the signal from the near-end participant, and from the estimated echo signal. Then they are transmitted to an estimation device ES designed according to the invention.

Based on the formula, $$P_{Echo,est} = P_{diff} \cdot \sqrt{\frac{P_{Sin}}{P_{est}}}$$

with $$P_{diff} = \frac{1}{2} \cdot (P_{Sin} - P_{err})$$

the echo estimation device ES estimates the electrical power of the echo which, as explained above, serves as a basis for regulating the adaptation control AS.

Figure 2:
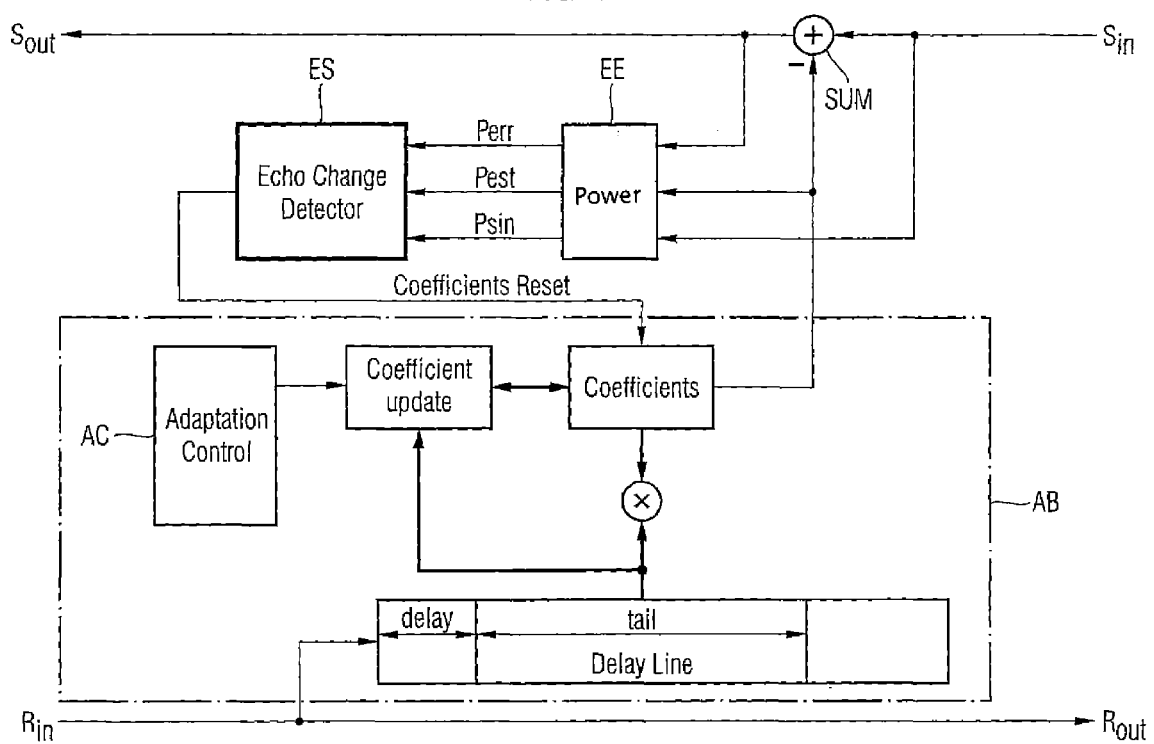
FIG. 2 shows a block diagram of an echo canceller implementing the inventive method, used to optimize electrical powers determined for the power balance based detection of echo changes and the control of the canceller.

FIG. 2 also shows a block diagram of an echo canceller, in which the identical elements are labeled the same in keeping with the previous figure description, In contrast to what was described before, the echo canceller implementing the inventive method shown in the representation uses the determined electrical power to optimize the power balance based detection of echo changes and the control of the canceller.

The embodiment of the invention represented also has a power determining device, which generates the same electrical power levels $P_{sin}$, $P_{err}$, $P_{est}$ from the abovementioned signals.

Unlike the first embodiment, these are passed along alternatively or supplementarily to a feed to an echo estimator on a detection device for the detection of echo changes, which the electrical power levels $P_{sin}$, $P_{err}$, $P_{est}$ balance according to $$P_\Delta = P_{sin} + P_{err} - P_{est}$$

with $$P_\Delta = s \cdot \sqrt{(P_{est} \cdot P_{err})}$$

with s being the result of a rough detection of a cross-talk effect, also called "double talk." A balancing at the summing point SUM of the echo canceller is carried out, which is fully in keeping with the requirements that the G168-2004 has set for a line echo canceller, since it makes a detection of echo changes and a requisite new adaptation possible within a few seconds as needed. In addition, this method is characterized by the fact that very little computing power is necessary, and thus optimal function is also ensured for applications that have a large number of channels.

The invention claimed is:

1. A method for adaptive filtering, in which a level of a reference signal necessary for the adaptive filtering is determined in a context of an adaptation by an estimation using a quantity equivalent to the reference signal, comprising:
    a) filtering a signal, wherein the filtering is dependent on an electrical power of at least one signal extracted from a transmission channel to be filtered;
    b) determining the equivalent quantity by a mathematical function based on the electrical power of at least the extracted signal; and
    c) estimating a fourth electrical power of an echo signal of the transmission channel is done by the mathematical function, with this being estimated based on a first electrical power, a second electrical power and a third electrical power;
wherein the estimate is defined according to the formula:

$$P_{Echo,est} = P_{diff} \cdot \sqrt{\frac{P_{Sin}}{P_{est}}}$$

with $$P_{diff} = \frac{1}{2} \cdot (P_{Sin} - P_{err})$$

with
    $P_{sin}$ being the first electrical power,
    $P_{err}$ being the second electrical power,
    $P_{est}$ being the third electrical power, and
    $P_{Echo,est}$ being a fourth electrical power.

2. The method of claim 1 wherein the method is carried out by an adaptive filter, the method further comprising:
    a) operating the adaptive filter as an echo canceller,
    b) resetting the adaptive filter into an initial state of the adaption, based on a balancing of a fifth electrical power at which an echo elimination signal is used as a summing point to generate an output signal of the adaptive filter.

3. The method of claim 2, wherein the resetting occurs by exceeding a first threshold value by an absolute quantity of the fifth electrical power.

4. A method for adaptive filtering, in which a level of a reference signal necessary for the adaptive filtering is determined in a context of an adaptation by an estimation using a quantity equivalent to the reference signal, comprising:
    a) filtering a signal, wherein the filtering is dependent on an electrical power of at least one signal extracted from a transmission channel to be filtered;
    b) determining an equivalent quantity by a mathematical function based on the electrical power of at least the extracted signal;
    c) estimating a fourth electrical power of an echo signal of the transmission channel is done by the mathematical function, with this being estimated based on a first electrical power, a second electrical power and a third electrical power;
    d) operating an adaptive filter as an echo canceller; and
    e) resetting the adaptive filter into an initial state of the adaption, based on a balancing of a fifth electrical power, at which the echo elimination signal is used as a summing point to generate an output signal of the adaptive filter; and
wherein the resetting occurs by exceeding a first threshold value by an absolute quantity of the fifth electrical power; and
wherein the resetting occurs when a duration during which the threshold value is exceeded without interruption attains a second threshold value defining a period.

5. A method for adaptive filtering, in which a level of a reference signal necessary for the adaptive filtering is determined in a context of an adaptation by an estimation using a quantity equivalent to the reference signal, comprising:
    a) filtering a signal, wherein the filtering is dependent on an electrical power of at least one signal extracted from a transmission channel to be filtered;
    b) determining an equivalent quantity by a mathematical function based on the electrical power of at least the extracted signal;
    c) estimating a fourth electrical power of an echo signal of the transmission channel is done by the mathematical function, with this being estimated based on a first electrical power, a second electrical power and a third electrical power;
    d) operating an adaptive filter as an echo canceller;
    e) resetting the adaptive filter into an initial state of the adaption, based on a balancing of a fifth electrical power, at which an echo elimination signal is used as a summing point to generate an output signal of the adaptive filter; and
    f) determining a first threshold value based on a proportional value indicative of double-talk as well as on the second electrical power and the third electrical power; and
wherein the resetting occurs by exceeding the first threshold value by an absolute quantity of a fifth electrical power.

6. The method of claim 5, wherein the determination of the first threshold value is defined according to the formula:

$$P_\Delta = s \cdot \sqrt{(P_{est} - P_{err})}$$

s being a proportional value for an indication,
Perr being the second electrical power,
Pest being the third electrical power, and
$P_{Echo,est}$ being a fourth electrical power.

7. A method for adaptive filtering comprising:
    determining a first electrical power, a second electrical power, and a third electrical power based on a sampled plurality of signals, the first electrical power being based on a power of a signal at a second port, the second electrical power being based a power of a signal at a first port, the third electrical power being based on a power of an estimated echo signal provided by an adaptation unit;
    determining a fourth electrical power based on the first electrical power, the second electrical power, and the third electrical power;
    inputting the fourth electrical power to an adaptation control of the adaptation unit;
    inputting the first electrical power to the adaptation control of the adaptation unit;
    the adaptation unit outputting the estimated echo signal based on the inputted fourth electrical power and the first electrical power;
    inputting the first electrical power, the second electrical power, and the third electrical power to an echo estimator on a detection device for detection of echo changes;

detecting a value of cross talk effect and balancing the first electrical power, the second electrical power, and the third electrical power according to a fifth electrical power; and resetting an echo canceller to an initial state of adaptation, wherein the resetting occurs based on an absolute quantity of the fifth electrical power exceeding a first threshold value; and wherein the resetting occurs based on a duration during which the first threshold value is exceeded without interruption and the absolute quantity of the fifth electrical power attains a second threshold value; and wherein the method is carried out by the echo canceller.

8. A method for adaptive filtering comprising:

determining a first electrical power, a second electrical power, and a third electrical power based on a sampled plurality of signals, the first electrical power being based on a power of a signal at a second port, the second electrical power being based a power of a signal at a first port, the third electrical power being based on a power of an estimated echo signal provided by an adaptation unit;

determining a fourth electrical power based on the first electrical power, the second electrical power, and the third electrical power;

inputting the fourth electrical power to an adaptation control of the adaptation unit;

inputting the first electrical power to the adaptation control of the adaptation unit; and the adaptation unit outputting the estimated echo signal based on the inputted fourth electrical power and the first electrical power;

inputting the first electrical power, the second electrical power, and the third electrical power to an echo estimator on a detection device for detection of echo changes;

detecting a value of cross talk effect and balancing the first electrical power, the second electrical power, and the third electrical power according to a fifth electrical power; and resetting an echo canceller to an initial state of adaptation, the resetting occurs based on an absolute quantity of the fifth electrical power exceeding a first threshold value, wherein the first threshold value is defined based on the detected value of cross talk effect as well as the second electrical power and the third electrical power; and wherein the method is carried out by the echo canceller.

9. A method for adaptive filtering comprising:

determining a first electrical power, a second electrical power, and a third electrical power based on a sampled plurality of signals, the first electrical power being based on a power of a signal at a second port, the second electrical power being based a power of a signal at a first port, the third electrical power being based on a power of an estimated echo signal provided by an adaptation unit;

determining a fourth electrical power based on the first electrical power, the second electrical power, and the third electrical power;

inputting the fourth electrical power to an adaptation control of the adaptation unit;

inputting the first electrical power to the adaptation control of the adaptation unit; and the adaptation unit outputting the estimated echo signal based on the inputted fourth electrical power and the first electrical power;

inputting the first electrical power, the second electrical power, and the third electrical power to an echo estimator on a detection device for detection of echo changes; and detecting a value of cross talk effect and balancing the first electrical power, the second electrical power, and the third electrical power according to a fifth electrical power, wherein the balancing is based on the formula:

$$P_\Delta = s \cdot \sqrt{(P_{est} - P_{err})}$$

$$P_\Delta = P_{sin} + P_{err} - P_{est}$$

s being the detected cross talk effect,
Psin being the first electrical power,
Perr being the second electrical power,
Pest being the third electrical power, and
$P_\Delta$ being the fifth electrical power; and
wherein the method is carried out by an echo canceller.

* * * * *